United States Patent
Vedula et al.

(10) Patent No.: US 7,763,351 B2
(45) Date of Patent: Jul. 27, 2010

(54) MELT SPUN ELASTIC TAPE AND PROCESS

(75) Inventors: Ravi R. Vedula, North Ridgeville, OH (US); Yona Eckstein, Coconut Creek, FL (US); Yinbing Xia, Beijing (CN); Stanley J. Nerderman, Kirtland, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 12/108,855

(22) Filed: Apr. 24, 2008

(65) Prior Publication Data

US 2008/0193733 A1      Aug. 14, 2008

Related U.S. Application Data

(62) Division of application No. 10/879,433, filed on Jun. 29, 2004.

(60) Provisional application No. 60/483,826, filed on Jun. 30, 2003.

(51) Int. Cl.
*D02G 3/00* (2006.01)

(52) U.S. Cl. ................. 428/364; 428/394

(58) Field of Classification Search .......... 428/220, 428/357, 364, 394, 292.1, 401
See application file for complete search history.

(56) References Cited

U.S. PATENT DOCUMENTS

| | | | |
|---|---|---|---|
| 3,233,025 A | 2/1966 | Frye et al. | |
| 3,518,337 A | 6/1970 | Nicolas | |
| 3,621,088 A | 11/1971 | Hatcher et al. | |
| 3,733,153 A | 5/1973 | Moziek | |
| 4,131,731 A * | 12/1978 | Lai et al. ............... 528/370 |
| 4,787,948 A * | 11/1988 | Ermert ................. 156/164 |
| 4,919,996 A | 4/1990 | Dewar et al. | |
| 5,284,489 A | 2/1994 | Liu et al. | |
| 5,310,872 A | 5/1994 | Takahashi et al. | |
| 5,349,028 A | 9/1994 | Takahashi et al. | |
| 5,371,166 A * | 12/1994 | Farkas et al. ........... 528/71 |
| 5,391,682 A | 2/1995 | Ogawa et al. | |
| 5,562,930 A | 10/1996 | Hills | |
| 6,399,003 B1 * | 6/2002 | Umezawa ............ 264/176.1 |
| 6,664,335 B2 * | 12/2003 | Krishnan ............... 525/123 |
| 6,706,380 B2 * | 3/2004 | Edwards et al. ........ 428/292.1 |
| 6,709,147 B1 | 3/2004 | Rauwendaal | |
| 6,709,742 B2 * | 3/2004 | Ladika et al. ........... 428/364 |
| 6,911,502 B2 * | 6/2005 | Vedula ................. 525/457 |
| 7,357,889 B2 * | 4/2008 | Vedula et al. .......... 264/172.17 |
| 2002/0065373 A1 * | 5/2002 | Krishnan ............... 525/455 |
| 2003/0065091 A1 | 4/2003 | Brann et al. | |
| 2003/0186008 A1 | 10/2003 | Sutton et al. | |
| 2005/0025966 A1 * | 2/2005 | Vedula et al. .......... 428/364 |
| 2005/0165193 A1 * | 7/2005 | Patel et al. ............ 526/352 |
| 2006/0021630 A1 * | 2/2006 | Lafauci et al. .......... 132/273 |
| 2008/0193733 A1 * | 8/2008 | Vedula et al. .......... 428/220 |

FOREIGN PATENT DOCUMENTS

| | | |
|---|---|---|
| CN | 1410605 A | 4/2003 |
| EP | 0972864 A1 | 1/2000 |
| EP | 1273606 A1 | 1/2003 |
| JP | 08144123 A | 6/1996 |

* cited by examiner

*Primary Examiner*—N. Edwards
(74) *Attorney, Agent, or Firm*—Joe A. Powell; Thoburn T. Dunlap; Christopher D. Hilker

(57) ABSTRACT

Articles such as melt spun elastic tape and heaving denier monofilament fibers are made from thermoplastic polyurethane (TPU) polymers. The process to make the articles involves using a substantially horizontal cooling to cool the melt spun articles. Preferably, the cooling is accomplished by a water bath. A crosslinking agent is added to the TPU polymer melt to enhance the elastic properties of the articles.

14 Claims, No Drawings

MELT SPUN ELASTIC TAPE AND PROCESS

CROSS REFERENCE

This is a division of Ser. No. 10/879,433 filed on Jun. 29, 2004 which claims priority to Provisional Application Ser. No. 60/483,826 filed on Jul. 30, 2003.

FIELD OF THE INVENTION

The present invention relates to a process for making melt spun elastic tape, heavy denier monofilament fibers (spandex) and various cross section shapes from thermoplastic polyurethane (TPU) compositions. The process has economic advantages over prior art processes and produces excellent products.

BACKGROUND OF THE INVENTION

Elastic tape made from thermoplastic polyurethane (TPU) has many uses, including uses in clothing applications, such as elastic waist bands, bra straps, and the like. Prior art methods to make elastic tape involves extruding a wide sheet of TPU, winding the sheet into a roll, transferring the role to a slitting operation where the wide sheet is slit to the desired narrow width and the narrow tape is wound into individual rolls for later end uses. This prior art method involves multiple steps which adds cost to the elastic tape.

Another prior art method to make the elastic tape is to extrude the TPU into the desired dimensions of the tape. This method also has limitations in the speed at which the tape can be produced. The elastic tape can also be made by dissolving the TPU in solvent and solvent casting the solution into tape. This method has the disadvantage of using solvent.

It is known to produce TPU fibers, either by the dry spinning method or the melt spinning method. The dry spinning method is the most common method commercially used today. The dry spinning method requires solvent and has large initial capital investment requirements. The melt spinning method is more environmentally friendly and requires less capital investment. Both the dry spinning and melt spinning processes are used in making small denier TPU fiber, usually from 10 to 70 denier size. Fiber size is expressed in denier which is the weight in grams of 9000 meters in length of the fiber. Thus, a 20 denier fiber would be one where 9000 meters in length of fibers would weigh 20 grams.

In normal melt spinning or dry spinning of fibers, after the fiber exits the spinneret, it travels through a series of rollers forming a vertical festoon to air cool the fibers before being wound into bobbins. This method works well for small fiber size. When larger denier fibers, such as 100 to 10,000 denier fibers are produced on this type of equipment, the hot fibers will sag or distort when run through the vertical festoon air cooler. The weight of the fibers are too great to be pulled into a vertical position without distorting and the larger size fibers are slower to cool, thus exaggerating the problem.

If a large denier fiber is desired, it is now made by winding several filaments of small denier fiber together to make a large size, such as is done with twine or rope. The multifilament strand can create problems in sewing garments containing the large denier fibers.

It would be desirable to have a melt spinning process for producing elastic tape, heavy denier monofilament fibers as well as other various cross section shapes from TPU.

SUMMARY OF THE INVENTION

It is an object of the present invention to make elastic tape by a novel melt spinning process where thermoplastic polyurethane polymer is melt spun directly into elastic tape, thereby eliminating the slitting step in make tape.

It is another object of the present invention to make heavy denier monofilament melt spun fibers from TPU polymer.

It is a further object of the present invention to produce various shaped articles by melt spinning TPU polymer.

These and other objects are accomplished by using a melt spinning process comprising:
  (a) melting the TPU polymer, preferably by using an extruder;
  (b) adding a cross-linking agent to the melted TPU polymer to enhance its elastic properties;
  (c) feeding the TPU polymer melt to a manifold, where said manifold divides the TPU polymer melt into multiple melt streams;
  (d) feeding each of said multiple melt streams to multiple spinnerets by using a melt pump, wherein each spinneret has an opening where the melt exits to form the desired shape of an article;
  (e) cooling said article by passing said article through a substantially horizontal cooling step, preferably a water bath; and
  (f) winding said article into a roll or bobbin.

DETAILED DESCRIPTION OF THE INVENTION

The TPU polymer type used in this invention can be any conventional TPU polymer that is known to the art and in the literature as long as the TPU polymer has adequate molecular weight. The TPU polymer is generally prepared by reacting a polyisocyanate with an intermediate such as a hydroxyl terminated polyester, a hydroxyl terminated polyether, a hydroxyl terminated polycarbonate or mixtures thereof, with one or more chain extenders, all of which are well known to those skilled in the art.

The hydroxyl terminated polyester intermediate is generally a linear polyester having a number average molecular weight (Mn) of from about 500 to about 10,000, desirably from about 700 to about 5,000, and preferably from about 700 to about 4,000, an acid number generally less than 1.3 and preferably less than 0.8. The molecular weight is determined by assay of the terminal functional groups and is related to the number average molecular weight. The polymers are produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from ε-caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to 12 carbon atoms, and include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like, 1,4-butanediol is the preferred glycol.

Hydroxyl terminated polyether intermediates are polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly (propylene glycol) comprising propylene oxide reacted with propylene glycol, poly(tetramethyl glycol) comprising water reacted with tetrahydrofuran (PTMEG). Polytetramethylene ether glycol (PTMEG) is the preferred polyether intermediate. Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of THF and ethylene oxide or THF and propylene oxide. These are available from BASF as Poly THF B, a block copolymer, and poly THF R, a random copolymer. The various polyether intermediates generally have a number average molecular weight (Mn) as determined by assay of the terminal functional groups which is an average molecular weight greater than about 700, such as from about 700 to about 10,000, desirably from about 1000 to about 5000, and preferably from about 1000 to about 2500. A particular desirable polyether intermediate is a blend of two or more different molecular weight polyethers, such as a blend of 2000 $M_n$, and 1000 $M_n$, PTMEG.

The most preferred embodiment of this invention uses a blend of two or more polyether intermediates, with one polyether being a higher molecular weight than the other polyether. The lower molecular weight polyether will have a molecular weight Mn of from 700 to 1500 Daltons while the higher molecular weight polyether will have a Mn from about 1500 to about 4000 Daltons, preferably from about 1800 to about 2500 Daltons. The blend should have a weighted average molecular weight of greater than 1200 Daltons, preferably greater than 1500 Daltons. For example, a 1000 gram sample of a blend of 70% by weight of a 2000 $M_n$ polyether and 30% by weight of a 1000 $M_n$, polyether would have a weighted average $M_n$, of 1538 Daltons of the two components in the 1000 grams mixture. The 2000 $M_n$ polyether component would have 0.35 moles (1000×0.7/2000). The 1000 $M_n$, polyether component would have 0.3 moles (1000×0.3/1000). The total moles would be 0.65 (0.35+0.3) moles in the 1000 gram sample and have a weighted average $M_n$, of (1000/0.65) or 1538 $M_n$.

The weight ratio in the blend of the first polyether hydroxyl terminated intermediate to the second hydroxyl terminated intermediate is from about 60:40 to about 90:10, and preferably from about 70:30 to 90:10. The amount of the first polyether intermediate is greater than the amount of the second intermediate.

The polycarbonate-based polyurethane resin of this invention is prepared by reacting a diisocyanate with a blend of a hydroxyl terminated polycarbonate and a chain extender. The hydroxyl terminated polycarbonate can be prepared by reacting a glycol with a carbonate.

U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecular with each alkoxy group containing 2 to 4 carbon atoms. Diols suitable for use in the present invention include aliphatic diols containing 4 to 12 carbon atoms such as butanediol-1,4, pentanediol-1,4, neopentyl glycol, hexanediol-1,6,2,2,4-trimethylhexanediol-1,6, decanediol-1,10, hydrogenated dilinoleylglycol, hydrogenated dioleylglycol; and cycloaliphatic diols such as cyclohexanediol-1,3, dimethylolcyclohexane-1,4, cyclohexanediol-1,4, dimethylolcyclohexane-1,3,1,4-endomethylene-2-hydroxy-5-hydroxymethyl cyclohexane, and polyalkylene glycols. The diols used in the reaction may be a single diol or a mixture of diols depending on the properties desired in the finished product.

Polycarbonate intermediates which are hydroxyl terminated are generally those known to the art and in the literature. Suitable carbonates are selected from alkylene carbonates composed of a 5 to 7 membered ring having the following general formula:

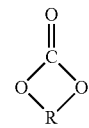

where R is a saturated divalent radical containing 2 to 6 linear carbon atoms. Suitable carbonates for use herein include ethylene carbonate, trimethylene carbonate, tetramethylene carbonate, 1,2-propylene carbonate, 1,2 butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate.

Also, suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Preferred examples of diarylcarbonates, which can contain 6 to 20 carbon atoms in each aryl group, are diphenylcarbonate, ditolylcarbonate, and dinaphthylcarbonate.

The reaction is carried out by reacting a glycol with a carbonate, preferably an alkylene carbonate in the molar range of 10:1 to 1:10, but preferably 3:1 to 1:3 at a temperature of 100° C. to 300° C. and at a pressure in the range of 0.1 to 300 mm of mercury in the presence or absence of an ester interchange catalyst, while removing low boiling glycols by distillation.

More specifically, the hydroxyl terminated polycarbonates are prepared in two stages. In the first stage, a glycol is reacted with an alkylene carbonate to form a low molecular weight hydroxyl terminated polycarbonate. The lower boiling point glycol is removed by distillation at 100° C. to 300° C., preferably at 150° C. to 250° C., under a reduced pressure of 10 to 30 mm Hg, preferably 50 to 200 mm Hg. A fractionating column is used to separate the by-product glycol from the reaction mixture. The by-product glycol is taken off the top of the column and the unreacted alkylene carbonate and glycol reactant are returned to the reaction vessel as reflux. A current of inert gas or an inert solvent can be used to facilitate removal of by-product glycol as it is formed. When amount of by-product glycol obtained indicates that degree of polymerization of the hydroxyl terminated polycarbonate is in the range of 2 to 10, the pressure is gradually reduced to 0.1 to 10 mm Hg and the unreacted glycol and alkylene carbonate are removed. This marks the beginning of the second stage of reaction during which the low molecular weight hydroxyl terminated polycarbonate is condensed by distilling off glycol as it is formed at 100° C. to 300° C., preferably 150° C. to 250° C. and at a pressure of 0.1 to 10 mm Hg until the desired molecular weight of the hydroxyl terminated polycarbonate is attained. Molecular weight (Mn) of the hydroxyl terminated polycarbonates can vary from about 500 to about 10,000 but in a preferred embodiment, it will be in the range of 500 to 2500.

The second necessary ingredient to make the TPU polymer of this invention is a polyisocyanate.

The polyisocyanates of the present invention generally have the formula $R(NCO)_n$, where n is generally from 2 to 4 with 2 being highly preferred inasmuch as the composition is a thermoplastic. Thus, polyisocyanates having a functionality of 3 or 4 are utilized in very small amounts, for example less than 5% and desirably less than 2% by weight based upon the total weight of all polyisocyanates, inasmuch as they cause crosslinking. R can be aromatic, cycloaliphatic, and aliphatic, or combinations thereof generally having a total of from 2 to about 20 carbon atoms. Examples of suitable aromatic diisocyanates include diphenyl methane-4,4'-diisocyanate (MDI), $H_{12}$ MDI, m-xylylene diisocyanate (XDI), m-tetramethyl xylylene diisocyanate (TMXDI), phenylene-1,4-diisocyanate (PPDI), 1,5-naphthalene diisocyanate (NDI), and diphenylmethane-3,3'-dimethoxy-4,4'-diisocyanate (TODI). Examples of suitable aliphatic diisocyanates include isophorone diisocyanate (IPDI), 1,4-cyclohexyl diisocyanate (CHDI), hexamethylene diisocyanate (HDI), 1,6-diisocyanato-2,2,4-tetramethyl hexane (TMDI), 1,10-decane diisocyanate, and trans-dicyclohexylmethane diisocyanate (HMDI). A highly preferred diisocyanate is MDI containing less than about 3% by weight of ortho-para (2,4) isomer.

The third necessary ingredient to make the TPU polymer of this invention is the chain extender. Suitable chain extenders are lower aliphatic or short chain glycols having from about 2 to about 10 carbon atoms and include for instance ethylene glycol, diethylene glycol, propylene glycol, dipropylene glycol, tripropylene glycol, triethylene glycol, cis-trans-isomers of cyclohexyl dimethylol, neopentyl glycol, 1,4-butanediol, 1,6-hexandiol, 1,3-butanediol, and 1,5-pentanediol. Aromatic glycols can also be used as the chain extender and are the preferred choice for high heat applications. Benzene glycol (HQEE) and xylenene glycols are suitable chain extenders for use in making the TPU of this invention. Xylenene glycol is a mixture of 1,4-di(hydroxymethyl) benzene and 1,2-di(hydroxymethyl) benzene. Benzene glycol is the preferred aromatic chain extender and specifically includes hydroquinone, i.e., bis(beta-hydroxyethyl)ether also known as 1,4-di(2-hydroxyethoxy)benzene; resorcinol, i.e., bis(beta-hydroxyethyl)ether also known as 1,3-di(2-hydroxyethyl) benzene; catechol, i.e., bis(beta-hydroxyethyl)ether also known as 1,2-di(2-hydroxyethoxy)benzene; and combinations thereof. For high heat resistant fibers and elastic tape, benzene glycol (HQEE) is the desired chain extender. A blend of two or more glycol chain extenders may be used. Excellent results are obtained by using HQEE together with an isomer of HQEE (HER).

It is preferred to use a co-chain extender together with the chain extender described above. The co-chain extender can be one of the materials described above as a chain extender. The co-chain extender is preferably selected from a material capable of reducing the crystallization rate of the TPU and eliminating high temperature melting peaks of the TPU. Branched compounds, such as dipropylene glycol and neopentyl glycol are excellent co-chain extenders. Also, for high heat applications, an isomer of HQEE, such as hydroxyl ethyl resorcinol (HER), is a very effective co-chain extender. When a co-chain extender is used, the level used is from about 2 to about 50 mole percent, preferably 10 to 30 mole percent, of the total moles of the chain extender and the co-chain extender.

The above three necessary ingredients (hydroxyl terminated intermediate, polyisocyanate, and chain extender) are preferably reacted in the presence of a catalyst.

Generally, any conventional catalyst can be utilized to react the diisocyanate with the polyether intermediate or the chain extender and the same is well known to the art and to the literature. Examples of suitable catalysts include the various alkyl ethers or alkyl thiol ethers of bismuth or tin wherein the alkyl portion has from 1 to about 20 carbon atoms with specific examples including bismuth octoate, bismuth laurate, and the like. Preferred catalysts include the various tin catalysts such as stannous octoate, dibutyltin dioctoate, dibutyltin dilaurate, and the like. The amount of such catalyst is generally small such as from about 20 to about 200 parts per million based upon the total weight of the polyurethane forming monomers.

The TPU polymers of this invention can be made by any of the conventional polymerization methods well known in the art and literature.

Thermoplastic polyurethanes of the present invention are preferably made via a "one shot" process wherein all the components are added together simultaneously or substantially simultaneously to a heated extruder and reacted to form the polyurethane. The equivalent ratio of the diisocyanate to the total equivalents of the hydroxyl terminated intermediate and the diol chain extender is generally from about 0.95 to about 1.10, desirably from about 0.97 to about 1.03, and preferably from about 0.97 to about 1.00. The Shore A hardness of the TPU formed should be from 65 A to 95 A, and preferably from about 75 A to about 85 A, to achieve the most desirable properties of the finished article. Reaction temperatures utilizing urethane catalyst are generally from about 175° C. to about 245° C. and preferably from about 180° C. to about 220° C. The molecular weight (Mw) of the thermoplastic polyurethane is generally from about 100,000 to about 800,000 and desirably from about 150,000 to about 400,000 and preferably about 150,000 to about 350,000 as measured by GPC relative to polystyrene standards.

The thermoplastic polyurethanes can also be prepared utilizing a pre-polymer process. In the pre-polymer route, the hydroxyl terminated intermediate is reacted with generally an equivalent excess of one or more polyisocyanates to form a pre-polymer solution having free or unreacted polyisocyanate therein. Reaction is generally carried out at temperatures of from about 80° C. to about 220° C. and preferably from about 150° C. to about 200° C. in the presence of a suitable urethane catalyst. Subsequently, a selective type of chain extender as noted above is added in an equivalent amount generally equal to the isocyanate end groups as well as to any free or unreacted diisocyanate compounds. The overall equivalent ratio of the total diisocyanate to the total equivalent of the hydroxyl terminated intermediate and the chain extender is thus from about 0.95 to about 1.10, desirably from about 0.98 to about 1.05 and preferably from about 0.99 to about 1.03. The equivalent ratio of the hydroxyl terminated intermediate to the chain extender is adjusted to give 65 A to 95 A, preferably 75 A to 85 A Shore hardness. The chain extension reaction temperature is generally from about 180° C. to about 250° C. with from about 200° C. to about 240° C. being preferred. Typically, the pre-polymer route can be carried out in any conventional device with an extruder being preferred. Thus, the hydroxyl terminated intermediate is reacted with an equivalent excess of a diisocyanate in a first portion of the extruder to form a pre-polymer solution and subsequently the chain extender is added at a downstream portion and reacted with the pre-polymer solution. Any conventional extruder can be utilized, with extruders equipped with barrier screws having a length to diameter ratio of at least 20 and preferably at least 25.

Useful additives can be utilized in suitable amounts and include opacifying pigments, colorants, mineral fillers, stabilizers, lubricants, UV absorbers, processing aids, and other additives as desired. Useful opacifying pigments include titanium dioxide, zinc oxide, and titanate yellow, while useful tinting pigments include carbon black, yellow oxides, brown oxides, raw and burnt sienna or umber, chromium oxide green, cadmium pigments, chromium pigments, and other mixed metal oxide and organic pigments. Useful fillers include diatomaceous earth (superfloss) clay, silica, talc, mica, wallostonite, barium sulfate, and calcium carbonate. If desired, useful stabilizers such as antioxidants can be used and include phenolic antioxidants, while useful photostabilizers include organic phosphates, and organotin thiolates (mercaptides). Useful lubricants include metal stearates, paraffin oils and amide waxes. Useful UV absorbers include 2-(2'-hydroxyphenol) benzotriazoles and 2-hydroxybenzophenones.

Plasticizer additives can also be utilized advantageously to reduce hardness without affecting properties.

During the melt spinning process, the TPU polymer described above is lightly crosslinked with a crosslinking agent. The crosslinking agent is a pre-polymer of a hydroxyl terminated intermediate that is a polyether, polyester, polycarbonate, polycaprolactone, or mixture thereof reacted with a polyisocyanate. A polyester or polyether are the preferred hydroxyl terminated intermediates to make the crosslinking agent. The crosslinking agent, pre-polymer, will have an isocyanate functionality of greater than about 1.0, preferably from about 1.0 to about 3.0, and more preferably from about 1.8 to about 2.2. It is particularly preferred if both ends of hydroxyl terminated intermediate is capped with an isocyanate, thus having an isocyanate functionality of 2.0.

The polyisocyanate used to make the crosslinking agent are the same as described above in making the TPU polymer. A diisocyanate, such as MDI, is the preferred diisocyanate.

The crosslinking agents have a number average molecular weight (Mn) of from about 1,000 to about 10,000 Daltons, preferably from about 1,200 to about 4,000 and more preferably from about 1,500 to about 2,800. Crosslinking agents with above about 1500 $M_n$ give better set properties.

The weight percent of crosslinking agent used with the TPU polymer is from about 2.0% to about 20%, preferably about 8.0% to about 15%, and more preferably from about 10% to about 13%. The percentage of crosslinking agent used is weight percent based upon the total weight of TPU polymer and crosslinking agent.

The preferred melt spinning process to make TPU heavy denier monofilament fibers, elastic tape, and other various shaped articles involves feeding a preformed TPU polymer to an extruder, to melt the TPU polymer and the crosslinking agent is added continuously downstream near the point where the TPU melt exits the extruder or after the TPU melt exits the extruder. The crosslinking agent can be added to the extruder before the melt exits the extruder or after the melt exits the extruder. If added after the melt exits the extruder, the crosslinking agent needs to be mixed with the TPU melt using static or dynamic mixers to assure proper mixing of the crosslinking agent into the TPU polymer melt. After exiting the extruder, the melted TPU polymer with crosslinking agent flows into a manifold. The manifold divides the melt stream into different streams, where each stream is fed to a plurality of spinnerets. Usually, there is a melt pump for each different stream flowing from the manifold, with each melt pump feeding several spinnerets. The spinneret will have a small hole through which the melt is forced and exits the spinneret in the form of a monofilament fiber, elastic tape, or other shaped article. The size of the hole in the spinneret will depend on the desired size (denier) of the fiber or tape.

Once the melt spun TPU article (fiber, tape, or other shape) exits the spinneret, the TPU is cooled in a substantially horizontal cooling apparatus, preferably a water bath. While it is preferred and most practical for the cooling apparatus to be horizontal, a slight angle could be tolerated such as less than 30 degree slope, preferably less than 10 degree slope, as long as it is not a high enough slope to cause distortion in the article. The temperature of the water in the bath is from about 0° C. to about 35° C. Regular cooling tower water, city water, or chilled water can be used. Other cooling medium could be used, such as air, as long as the article is maintained in a substantially horizontal position until cooled. The article is wound up on suitable rolls or if a fiber is wound into bobbins for later use by customers. Once the polymer melt exits the spinnerets, it should be placed in contact with the cooling medium as quickly as possible. This can be accomplished by having the cooling bath located close to the spinneret exit. Preferably, the cooling bath is located within 1.0 inch to 2.0 feet of the spinneret exit, more preferably, from 1.0 to 2.0 feet. The cooling step is where this process differs from the known fiber melt spinning process. With heavy weight articles as in this invention, the normal melt spun fiber vertical cooling process is not acceptable. The heavy articles would distort as a result of the vertical cooling process and not receive an adequate rate of cooling from the normal air cooled process.

Another important feature of this process is the fast speed at which the process can be run. For example, in making elastic tapes, the speed is from 200 to 800 meters per minute, with a typical speed of 400 meters per minute. The melt spinning process to produce tape is much faster than the extrusion of a sheet and the slitting operation is avoided by using the process of this invention.

The hole in the spinneret would be a circle shape if a heavy denier fiber is being made and would be a rectangle shape if an elastic tape is being made. The hole could be any shape depending on the cross-sectional shape of the desired end product. Elastic tapes are rectangle shaped and usually have a width of from 0.1 to 2.0 inches, preferably from 0.2 inch to 1.0 inch, with 0.25 inch being a common size. The thickness of the tape can be from 0.001 to 0.010 inch thick, preferably 0.003 to 0.005 inch thick, with 0.004 inch thick being a common size.

The heavy denier monofilament fibers are from 100 to 10,000 denier, preferably greater than 140 denier. Preferred denier size is from 140 to 2000 denier. Very large denier fibers, greater than 2000, can be made by this process but the commercial application for such extremely large sizes is limited. The heavy denier TPU fibers made by this invention are mono-filament fibers. In the prior art, heavy denier TPU fibers are multi-filament fibers, because of the limitation of the known process to make mono-filament in large sizes. Multi-filament fibers have some disadvantages when being incorporated into garments.

When fibers are made by the process of this invention, anti-tack additives such as finish oils, an example of which are silicone oils, are usually added to the surface of the fibers after or during cooling and just prior to being wound into bobbins. The anti-tack additives can also be added to the cooling water bath and coats the fiber as the fiber is moved through the cooling bath.

An important aspect of the melt spinning process is the mixing of the TPU polymer melt with the crosslinking agent. Proper uniform mixing is important to achieve uniform fiber properties and to achieve long run times without experiencing fiber breakage. The mixing of the TPU melt and crosslinking agent should be a method which achieves plug-flow, i.e., first in first out. The proper mixing can be achieved with a dynamic mixer or a static mixer. Static mixers are more difficult to clean; therefore, a dynamic mixer is preferred. A dynamic mixer which has a feed screw and mixing pins is the preferred mixer. U.S. Pat. No. 6,709,147, which is incorporated herein by reference, describes such a mixer and has mixing pins which can rotate. The mixing pins can also be in a fixed position, such as attached to the barrel of the mixer and extending toward the centerline of the feed screw. The mixing feed screw can be attached by threads to the end of the extruder screw and the housing of the mixer can be bolted to the extruder machine. The feed screw of the dynamic mixer should be a design which moves the polymer melt in a progressive manner with very little back mixing to achieve plug-flow of the melt. The L/D of the mixing screw should be from over 3 to less than 30, preferably from about 7 to about 20, and more preferably from about 10 to about 12.

The temperature in the mixing zone where the TPU polymer melt is mixed with the crosslinking agent is from about 200° C. to about 240° C., preferably from about 210° C. to about 225° C. These temperatures are necessary to get the reaction while not degrading the polymer.

The TPU formed is reacted with the crosslinking agent during the melt spinning process to give a molecular weight (Mw) of the TPU in final form, (such as fiber or tape), of from about 200,000 to about 800,000, preferably from about 250,000 to about 500,000, more preferably from about 300,000 to about 450,000.

The spinning temperature (the temperature of the polymer melt in the spinneret) should be higher than the melting point of the polymer, and preferably from about 10° C. to about 20° C. above the melting point of the polymer. The higher the spinning temperature one can use, the better the spinning. However, if the spinning temperature is too high, the polymer can degrade. Therefore, from about 10° C. to about 20° C. above the melting point of the TPU polymer, is the optimum for achieving a balance of good spinning without degradation of the polymer. If the spinning temperature is too low, polymer can solidify in the spinneret and cause fiber breakage. The spinning temperature for the high heat resistant fibers or tape produced by this invention is greater than 200° C. and preferably from about 205° C. to about 220° C.

The fibers and elastic tape can be combined with other fibers, both natural and synthetic, such as cotton and polyester, in various garments. The TPU fibers are typically combined with other fibers by weaving or knitting. The resultant fabrics will usually contain from 5 to 40 percent TPU fibers and the remainder other typical fibers. The level of TPU fibers used is dependent on the end use application. The elastic tape is suitable for use in bra straps, waist bands, collars, leg and arm cuffs of clothing, such as undergarments, sweaters, athletic wear, and the like. The elastic TPU tape and heavy denier fibers have the advantage of being able to be heat sealed to fabric, unlike vulcanized rubber.

The invention will be better under stood by reference to the following examples.

EXAMPLES

Example 1 is presented to show a melt spun elastic tape made from a TPU polymer. Example 2 is presented to show a melt spun heavy denier monofilament fiber made from TPU. The TPU polymer used in the Examples was made by reacting a mixture preheated to 120° C. of: 54.8968 parts by weight of polyether intermediate (PTMEG) of molecular weight ($M_n$) 2000, 23.5272 parts by weight of polyether intermediate (PTMEG) of molecular weight ($M_n$) 1000, 8.2149 parts by weight of benzene glycol (HQEE) chain extender, 0.3 parts by weight of antioxidant and 0.3 parts by weight of UV stabilizer, was reacted at a temperature of 200° C. with 21.5760 parts by weight of MDI and 0.4 parts by weight of lubricant in a 40 mm co-rotating twin screw extruder in the presence of 50 ppm stannous octoate acting as a catalyst. The resulting polymer was underwater pelletized and collected in a silo heated at 105° C. to dry the product. The resultant TPU had a molecular weight ($M_n$) of 150,000 Dalton and was used in Examples 1 and 2 to make melt spun elastic tape (Example 1) and melt spun heavy denier fibers (Example 2).

Example 1

Pellets of the above TPU were fed to a single screw extruder equipped with a screw having a L/D greater than 24 and melted in the extruder. The melted TPU was fed to a dynamic mixer where the crosslinking agent (Hyperlast 5196), when used, was mixed with the TPU. The TPU was then fed to a manifold where the stream was divided and the divided streams were fed to multiple spinnerets by using a melt pump. The melt was spun into elastic tape having a width of 0.25 inch (6 mm) and a thickness of 0.005 inch (0.12 mm). The tape was immediately cooled in a horizontal water bath maintained at a temperature of between 18° C. and 20° C. The tape was wound into a roll. Physical properties of the tape with 0%, 4%, 6% and 8% by weight crosslinking agent (Hyperlast 5196) were tested along with a commercial TPU tape and the results are shown below in Table I.

TABLE I

| X-Linker (%) | 300% Modulus (psi) | Elong. (%) | Tenacity (psi) | Set 1st Cycle (%) | Set 5th Cycle (%) |
|---|---|---|---|---|---|
| 0 | 1069 | 743 | 3036 | 30 | 43 |
| 4 | 1571 | 652 | 5200 | 18 | 28 |
| 6 | 1861 | 583 | 5690 | 12 | 31 |
| 8 | 1676 | 607 | 5650 | 16 | 27 |
| *Commercial Tape | 911 | 742 | 4118 | 25 | 41 |

*Commercial tape made by Nisshinbo of Japan

From the results shown in Table 1, it can be seen that the tape having crosslinking agent mixed with the TPU gives improved (lower) % set than tape TPU without crosslinking agent and lower % set than the commercial (prior art) tape. Also, the tape of this invention have higher tenacity and higher modulus than the tape without crosslinking agent and the commercial tape.

Example II

The TPU used in Example 1 was used in this Example. 12% by weight of crosslinking agent was used (Hyperlast 5196). The same process was used as in Example 1, except the spinnerets used a die to give a 1400 denier monofilament fiber. The properties of the fiber are shown in Table II.

TABLE II

| Gram/Denier | Property |
|---|---|
| | 1st Load Pull (%) |
| 0.094 | 100 |
| 0.124 | 150 |
| 0.154 | 200 |
| 0.270 | 300 |
| | 1st Unload Pull (%) |
| 0.045 | 200 |
| 0.032 | 150 |
| 0.023 | 100 |
| | 5th Load Pull (%) |
| 0.037 | 100 |
| 0.054 | 150 |
| 0.076 | 200 |
| 0.218 | 300 |
| | 5th Unload Pull (%) |
| 0.046 | 200 |
| 0.032 | 150 |
| 0.021 | 100 |
| 26.0 | % Set After 5th Pull |
| 0.845 | Break Load gm/denier |
| 523 | Break Elongation (%) |

The data shows that both the elastic tape and the heavy denier elastic monofilament have excellent properties.

While in accordance with the Patent Statutes, the best mode and preferred embodiment has been set forth, the scope of the invention is not limited thereto, but rather by the scope of the attached claims.

What is claimed is:

1. A melt spun TPU monofilament fiber having a size greater than 100 denier, or an elastic tape, wherein said fiber or said tape comprises the reaction product of:
   (a) a blend of at least two polyether hydroxyl terminated intermediates wherein said polyether have different $M_n$;
   (b) at least one chain extender;
   (c) at least one polyisocyanate; and
   (d) at least one crosslinking agent; wherein said TPU in said monofilament fiber or said tape has a 300% modulus of from 1571 to 1861 psi, an elongation of from 583 to 652%, and a tenacity of from 5200 to 5690 psi.

2. The melt spun fiber or tape of claim 1, wherein said two polyethers have a weighted average $M_n$ of greater than 1500 Daltons.

3. The melt spun fiber or tape of claim 1, wherein said fiber or said tape has a $M_w$ of from about 200,000 to about 800,000 Daltons.

4. The melt spun fiber or tape of claim 3, wherein said fiber or said tape has a $M_W$ of from about 300,000 to about 450,000 Daltons.

5. The melt spun fiber or tape of claim 1, wherein said chain extender is benzene glycol (HQEE).

6. The melt spun fiber or tape of claim 1, wherein said chain extender is a blend of benzene glycol (HQEE) and hydroxyl ethyl resorcinol (HER).

7. The melt spun fiber or tape of claim 1, wherein said polyisocyanate is a diisocyanate.

8. The melt spun fiber or tape of claim 1, wherein said crosslinking agent has a $M_n$ of from about 1,000 to about 10,000 Daltons.

9. The melt spun fiber or tape of claim 8, wherein said crosslinking agent has a $M_1$ of from about 1,500 to about 2,800 Daltons.

10. The melt spun fiber of claim 1, wherein said fiber has a size greater than about 100 denier.

11. The melt spun fiber of claim 10, wherein said fiber has a size greater than about 140 denier.

12. The melt spun fiber of claim 11, wherein said fiber has a size of from about 140 to about 10,000 denier.

13. The melt spun tape of claim 1, wherein said tape has a thickness of from about 0.001 inch to about 0.10 inch and a width of from about 0.1 inch to about 2.0 inches.

14. The melt spun fiber or tape of claim 1, wherein said crosslinking agent is used at a level of from about 2.0 to about 20.0 weight percent of said fiber or said tape.

* * * * *